United States Patent [19]

Lee

[11] Patent Number: 5,486,558
[45] Date of Patent: Jan. 23, 1996

[54] PLASTIC CLOSURES AND CLOSURE LINERS

[75] Inventor: Robert W. Lee, Houston, Tex.

[73] Assignee: Shell Oil Company, Houston, Tex.

[21] Appl. No.: 328,334

[22] Filed: Oct. 24, 1994

Related U.S. Application Data

[63] Continuation of Ser. No. 80,338, Jun. 21, 1993, abandoned.

[51] Int. Cl.$^6$ ........................................ C08L 33/00
[52] U.S. Cl. .................... 524/241; 524/269; 524/394; 524/523; 524/528
[58] Field of Search .................. 524/241, 523, 524/528, 269, 241, 394

[56] References Cited

U.S. PATENT DOCUMENTS

| | | | |
|---|---|---|---|
| 4,343,754 | 8/1982 | Wilde et al. | 264/154 |
| 4,378,893 | 4/1983 | Wilde et al. | 215/246 |
| 4,497,765 | 2/1985 | Wilde et al. | 264/268 |
| 4,500,681 | 2/1985 | Shulman | 525/222 |
| 4,545,496 | 10/1985 | Wilde et al. | 215/252 |
| 4,665,130 | 5/1987 | Hwo | 524/523 |
| 4,807,772 | 2/1989 | Schloss | 215/349 |
| 4,846,362 | 7/1989 | Schloss | 215/349 |
| 4,922,588 | 5/1990 | Borchardt et al. | 24/576 |
| 4,984,703 | 1/1991 | Burzynski | 215/350 |

OTHER PUBLICATIONS

Hawleys Comdensed Chemical Dictionary, Inving Sox, New York, 1987, pp. 933, 938.

*Primary Examiner*—Mark Sweet
*Attorney, Agent, or Firm*—James O. Okorafor; Y. Grace Tsang

[57] ABSTRACT

Improved polymer compositions, useful in the manufacture of closures and as liners for reclosable container closures, comprising blends of semicrystalline poly(1-butene), ethylene-methylene acrylate, polypropylene random copolymer, wherein the polypropylene random copolymer and the ethylene methyl acrylate can be used singularly or in combination, a lubricating agent and optionally, low density polyethylene. The inventive polymer compositions are recyclable, and do not present the environmental, health, and odor problems associated with polymer liners known in the art.

5 Claims, No Drawings

PLASTIC CLOSURES AND CLOSURE LINERS

This is a continuation of application Ser. No. 08/080,338, filed Jun. 21, 1993 now abandoned.

FIELD OF THE INVENTION

This invention relates to a novel blend of polyolefinic polymers. More particularly, the invention relates to such a blend which is useful in the manufacture of composite closures and as the liner for reclosable container closures.

BACKGROUND OF THE INVENTION

Plastic closures and liners, and methods of producing these closures and liners are known in the art. These liners are typically used as liners for the closure of a reclosable glass or plastic container, especially glass or plastic bottles. The liners provide sealability and sealing integrity under top loading conditions, and easy reclosability. Sealing integrity can be defined as the force required to effectively seal a container while maintaining its internal pressure. Generally, a minimal amount of force is preferred. A satisfactory liner composition for both glass and plastic containers is characterized by the ability to be consistently formulated, and processed, e.g. by compression molding, using conventional apparatus and methods.

Closures are generally required to have a minimal threshold removal torques, carbonation retention, carbonation retention under top load and satisfactory functioning on a container when cycled through environmental changes of temperature and humidity.

Most closures and closure liners in commerce are produced singularly or in combination from a plasticized polyvinyl chloride (PVC), polyethylene, EVA copolymer and an oil-extended thermoplastic elastomer.

Blends that have the following properties are suitable to be used as linear material and for the manufacture of closures:

| | |
|---|---|
| Compression Set: | <70% |
| Hardness, Shore A: | <85 |
| Tensile Yield Strength: | 1,000 to 2,000 psi |

These polymer materials and the closures and liners made from the previously enumerated polymers have the following non-exclusive problems or drawbacks.

Polyethylene is not soft and elastic enough to sustain the internal pressure that is generated inside the bottle or container by the carbonated beverage, and it also does not have enough creep resistance to provide reclosability to the closure.

Liners or closures made from rubber or elastomeric blends contain a significant portion of a low molecular weight mineral oil. The oil in the liner formulation can be extracted by the contained beverage, and introduce foreign material into the beverage, and consequently impair the odor and taste of the beverage.

It is known in the art that plasticized PVC has high removal torque which causes inconvenience to users, especially elderly users and children. It is known that it is not-recyclable with other polyolefins such as polypropylene.

Liners or closures made from EVA copolymer when subjected to elevated temperature during the extrusion and/ or compression stage, tends to decompose and give off acetic acid which causes organoleptic problems in food packaging. Even after the parts made with EVA are cooled and solidified, it impairs the taste and odor of the food or beverage that comes in contact with the plastic surface.

It is an unsolved problem of the art to provide polymer materials useful in the manufacture of closures, and as closure liners that do not have the drawbacks associated with liners known in the art.

SUMMARY OF THE INVENTION

The present invention provides novel blends of certain polyolefinic polymers useful in certain packaging applications. More particularly, the invention provides blends of poly(1-butene) homopolymers, copolymers and mixtures thereof, polypropylene random copolymers, ethylene methyl acrylate, wherein the polypropylene random copolymers and ethylene methyl acrylate can be present singularly or in combination, an effective amount of a lubricating agent, and optionally low density polyethylene. These blends find specific utility as the liners for reclosable container closures and do not have the problems or drawbacks associated with liners known in the art. The invention further provides improved closure liners and improved closures incorporating the liners.

DESCRIPTION OF THE INVENTION

Generally speaking, the closures and closure liners of this invention comprises a polymer blend of poly(1-butene) including its homopolymers, copolymers, and mixtures thereof, polypropylene random copolymer, ethylene methyl acrylate, an effective amount of a lubricating agent, preferably a solid lubricating agent and optionally low density polyethylene (LDPE). These blend components are present in predetermined amounts which contribute towards the improved properties of the closure, and of the closure liner.

The poly(1-butene) component of the blends of the invention is a semicrystalline 1-butene polymer. This polymer is suitably a homopolymer containing substantially only 1-butene moieties or is a copolymer having a major proportion of units derived from 1-butene and a minor proportion of units derived from a second $\alpha$-olefin of up to 14 carbon atoms inclusive, e.g., ethylene, propylene, 1-hexene, 4-methyl-1-pentene, 1-octene or 1-tetradecene, or mixtures thereof. The poly(1-butene) blend component usefully contains up to about 30 mole % of such second $\alpha$-olefins. When the poly(1-butene) is copolymeric, proportions of the second $\alpha$-olefin range from about 0.1 mole % to about 20 mole percent.

The degree of crystallinity of the semicrystalline poly(1-butene) as measured by an X-ray diffraction method is from about 10% to about 60%, but preferably is from about 35% to about 60%. The crystallization temperature of the poly(1-butene) as measured by a differential scanning calorimeter is typically from about 30° C. to about 90° C. and the limiting viscosity number of the polymer, as determined by a conventional capillary viscosity measuring device in decalin at 135° C., is from about 0.8 dl/g to about 8 dl/g, more often from about 1 dl/g to about 6 dl/g. Such poly(1-butene) polymers, both homopolymeric and copolymeric are commercially available, and can be obtained from Shell Chemical Company, Houston, Tex.

The polymeric blends of the invention will typically contain a substantial proportion of the poly(1-butene) polymer. Amounts of poly(1-butene) from about 20% by weight to about 85% by weight based on total blend, as satisfactory. Amounts of poly(1-butene) from about 30% by weight to about 70% by weight on the same basis are preferred.

Polypropylene random copolymers which are useful in the practice of this invention are a type of polypropylene in which the basic structure of the polymer chain has been changed by the incorporation of a different monomer molecule. Ethylene is the most common comonomer used. This causes changes to the physical properties of polypropylene. In comparison with polypropylene homopolymer, random copolymers features improved optical properties, improved impact resistance, increased flexibility, and a decreased melting point.

Ethylene/propylene random copolymer differs from homopolymer because the ethylene molecules randomly inserted into the backbone hinder the crystal-type arrangement of the polymer molecules. This reduction in copolymer crystallinity is responsible for the modification of the above-mentioned physical properties.

Ethylene/propylene random copolymers are produced by the simultaneous polymerization of propylene and ethylene in the same reactors used to produce homopolymer polypropylene.

Ethylene-methylene acrylate copolymer which is useful in the practice of this invention is one of the most thermally stable of all the high-pressure α-olefin copolymers. Unlike EVA copolymer, it is thermally stable and can be processed at extrusion temperature at 600° F.

The polymer is produced in a conventional high-pressure, autoclave reactor where methyl acrylate monomer is injected into the reactor with the ethylene gas to produce a random copolymer.

The most notable property changes offered by the copolymer, as compared to a LDPE homopolymer, are the depression of the soften temperature and a reduction of flexural modulus.

Low density polyethylene which is useful in the practice of this invention is a thermoplastic obtained through the high-pressure free radical polymerization of ethylene. Conventional LDPE is manufactured by one of two processes, tubular or autoclave. In both processes, high purity ethylene is introduced into the reactor at high pressures and temperatures with an initiator. The initiator may be either oxygen or an organic peroxide.

Unlike the linear structure obtained in other polyethylene processes, the LDPE, with density normally less than 0.94 gm/cc, has a branched structure resulting from the high pressure process. The branching gives conventional LDPE its distinctive properties of clarity, flexibility, and ease of processability.

Any LDPE that has a density of 0.93 gm/cc or less, and melt index of 2 to 15 can be used in the formulation. A typical example of LDPE used in the formulations is Chevron Poly-eth 1019, which has 14.5 MI and 0.92 in density.

The blends of the invention suitably but optionally contain a variety of conventional additives to improve or otherwise modify the properties of the blend. Such additives include stabilizers, antioxidants, processing aids, and pigments. One type of additive found particularly useful on some occasions in the blends is a lubricating agent. Such additives are better known by a variety of more common names such as slip agent or mold release agent which seem to depend upon the particular property modification contemplated for the additive. Illustrative lubricating agent, preferably a solid lubricating agent include organic materials such as silicones, particularly dimethylsiloxane polymers, fatty acid amides such as ethylene bis(stearamide), oleamides and erucamide; and metal salts of fatty acids such as zinc, calcium, or lead stearates. Also suitable are inorganic materials such as talc, mica, fumed silica and calcium silicate. In blends to be used for the purposes of the invention are organic slip agents and particularly preferred are the fatty acid amides, oleamides, and erucamide.

As stated, the use of a solid lubricating agent is preferred and quantities of lubricating agent of from about 0.5% to about 5% by weight based on total blend are satisfactory. In a preferred formulation, the solid lubricating agent is present in an amount of from about 2 to about 4% wt.

The method of producing the polymer blends is not critical and conventional methods of producing blends of two or more polymeric materials are suitable. In one formulation the poly(1-butene), random polypropylene copolymer and, solid lubricating agent are blended in a mixing device operating under conditions of high shear. In a second and generally preferred formulation, the blend components comprising poly(1-butene), random polypropylene copolymer, ethylene methyl acrylate and low density polyethylene are passed through an extruder and the blend is produced as the extrudate.

The blends of the invention are useful in a number of the conventional uses of blends of thermoplastic polymers. A particular use for the blends, however, is as liners for reclosable container closures. A container of the type which would employ a liner composed of the blends of the invention could be of a variety of sizes or shapes including those containers typically referred to as bottles or jars. A closure for such container generally comprises a circular base wall and a peripheral skirt extending downwardly from the wall which contains some means, e.g., threads, designed to engage some portion, e.g., complimentary threads, of the container at one or more points in close proximity to the container opening. With reference to the preferred type of container, i.e. bottles, such closures are commonly referred to as "bottle caps." The closure is generally made from a material which is substantially rigid but has some degree of deformability. The liners of the invention are particularly useful when employed in conjunction with a closure made of thermoplastic polymer. Closures made of metal are satisfactory but preferred are closures made from polypropylene and polyethylene. The closure must meet certain requirements such as having a minimal threshold removal torque, retention of carbonation if present in the contents of the container and retain such properties during changes in temperature and humidity. These requirements are most often met by the inclusion of a liner at the lower surface of the base wall so that the liner will be imposed upon the top of the container as the closure is tightened. Use of the blends of the invention as liner material enables the closure to meet these and other requirements.

The liner is provided to the container by a variety of conventional methods. In one embodiment, a film of a blend of the invention of suitable thickeners is produced as by extrusion and circular disks of appropriate diameter are cut from the film and provided individually to pre-formed closures also made by conventional procedures such as injection molding. The disks should be of such diameter as will snugly fit inside the skirt of the closure when placed against the internal surface of the base wall. The disks are fixed to the closure by well known methods such as through use of an adhesive or by application of heat. In a second and generally preferred embodiment, the liner is extruded, cut and pressure molded inside the closure.

Closures made with liners of the blends of the invention demonstrate the requisite properties of an acceptable reclosable container closure. They are easily removed from the container with satisfactory removal torque and can be removed and reclosed throughout the life of the contents of the container. The liners provide gas-tight packaging integrity and temperature stability during shipping and storage, as well as carbonation retention even under the top load when the contents of the container is carbonated, e.g. a carbonated beverage. Moreover, the components of the liner do not pose health or environmental problems and are not extractable during use by food or drink liquids.

The invention is further described by the following non-limiting examples and data table.

EXAMPLE

To produce blends of the invention, ethylenepolypropylene copolymers produced by Shell Chemical Company and three poly(1-butene) polymers, also produced by Shell Chemical Company, were employed. Optionally, low density PE was used in some blends. As a lubricating agent, oleamide (Kemamide U) was used. The blend components were tumbled and then compounded during passage through a 1.25 in. Brabender Extruder with a Maddox mixing screw. The screw was run at maximum RPM and the temperature profile was from 193° C. to 216° C. The extruded strands were pelletized. From these pellets, films of the blends are produced by extrusion and from these films are cut disks for evaluation as closure liners. In a preferred procedure, the pellets are extruded into film, disks are cut and compression molded into closures for polyethylene terephthalate bottles for carbonated beverages. The composition of the blends evaluated is shown in the Table.

TABLE (In wt %)

| Sample | Slip Agent | PB0300 | PB0400 | PB8340 | PP6C44 | EMA | LDPE |
|---|---|---|---|---|---|---|---|
| 1 | 4.0 | 32.0 |  | 32.0 | 32.0 |  |  |
| 2 | 4.0 | 32.0 | 32.0 |  | 32.0 |  |  |
| 3 | 4.0 |  |  | 46.0 | 25.0 | 25.0 |  |
| 4 | 4.0 |  | 36.0 | 36.0 | 24.0 |  |  |
| 5 | 4.0 | 25.0 |  | 25.0 |  | 46.0 |  |
| 6 | 4.0 | 32.0 |  | 32.0 |  | 32.0 |  |
| 7 | 4.0 |  |  | 46.0 |  | 25.0 | 25.0 |
| 8 | 4.0 |  | 24.0 | 24.0 |  | 24.0 | 24.0 |

PBO300 is a polybutylene homopolymer available from Shell Chemical Company.
PBO400 is a polybutylene homopolymer available from Shell Chemical Company.
PB8340 is a polybutylene copolymer available from Shell Chemical Company.
PP6C44 is a polypropylene random copolymer available from Shell Chemical Company. It has a 5.5 wt % ethylene content, tensile yield strength of 3,200 psi and a flexural modulus of 85,000 psi.
EMA is Exxon OTEMA TC-220 copolymer which has 34 wt % methyl acrylate and melt index (0.5).
LDPE is Chevron poly-eth 1019 which has a melt index (14.5) and a density of 0.92 g/l.
Slip Agent used is Kemamide U.

When the blends of illustrative Embodiment I were used as liners for polypropylene closures for bottles containing carbonated beverages, the line closures exhibited good temperature stability, sealability, sealing integrity under top load and easy reclosability.

While this invention has been described in detail for the purpose of illustration, it is not to be construed as limited thereby but is intended to cover all changes and modifications within the spirit and scope thereof.

What is claimed is:

1. A closure liner comprising a blend consisting essentially of poly (1-butene), random polypropylene copolymer, ethylene methyl acrylate and an effective amount of lubricating agent;

wherein said poly (1-butene) is present in an amount of about 20–85% wt, said ethylene methyl acrylate is present in an amount of about 20–80% wt, said polypropylene is present in an amount of about 20–80% wt, and said lubricating agent is present in an amount of about 0.5–5% wt;

wherein said poly (1-butene) is semicrystalline having from about 35% to about 60% crystallinity, and wherein the crystallization temperature of said poly (1-butene) is from about 30° C. to about 90° C. as measured by a differential scanning calorimeter.

2. A liner as in claim 3 wherein said lubricating agent is a solid material.

3. A closure liner as in claim 1 wherein said polypropylene random copolymer is present in an amount of from about 20–50% wt, said poly (1-butene) is present in an amount of from about 30–70% wt, said ethylene methyl acrylate is present in an amount of from about 30–70% wt, and said lubricating agent is present in an amount of from 2–4% wt.

4. A closure liner as in claim 1 wherein said lubricating agent is an organic material selected form the group consisting of silicones, fatty amides, and metal salts of fatty acids.

5. A liner as in claim 4 wherein said lubricating agent is oleamide.

* * * * *